INVENTOR
Charles W. Young

3,416,280
CONTOURED INSERT SUPPORT FOR UPSTANDING I-BEAM ELEMENTS OF A CARGO-SUPPORTING FLOOR

Charles W. Young, Catonsville, Md., assignor to Revere Copper and Brass Incorporated, New York, N.Y., a corporation of Maryland
Filed Oct. 5, 1965, Ser. No. 493,092
5 Claims. (Cl. 52—588)

ABSTRACT OF THE DISCLOSURE

A contoured support for cargo-supporting floors is provided of extruded or formed shape such that it can be inserted between the upstanding cargo-supporting floor beams and thus reinforce and supplement the cargo-supporting floor provided by the upstanding beams.

---

This invention relates to metal shapes for the cargo-supporting floor of vehicles and the like and, more particularly, to a contoured insert support for the upstanding I-beam elements of such a floor.

In cargo vehicles such as truck trailers and railway cars, the provision of refrigeration for cooling the cargo has necessitated the development of a cargo-supporting floor which supports the cargo above the base floor so that the refrigerated atmosphere within the vehicle can be circulated below as well as around the sides and top of the cargo. The cargo-supporting floor can be provided by upstanding I-beams formed in or secured to the base floor or they can be formed in supplemental floor sections such as are described in the United States patents to Constance No. 2,786,556, Black No. 2,923,384 and Weiler No. 2,952,341, mounted on the base floor. The supporting floor is in the form of upstanding I-beam supporting elements which hold the cargo spaced above the vehicle floor, and the supporting elements are spaced apart to permit cold air to circulate under the thus-supported cargo. In the case of panel-like supplemental floor sections, the sections are provided with locking elements along two opposite sides to permit adjacent panels to be mechanically interlocked. The design of the panels, of the supporting elements and of the locking elements is advantageously such as to permit each entire section to be extruded or otherwise fabricated from billets of any appropriate metal such as aluminum.

At the side and rear entrances of a truck-trailer body where heavy cargo is deposited by a lift truck and is then turned or pushed along the I-beams forming the supporting floor, the beams are subjected to extreme distortion forces and are frequently bent out of shape by these impart and turning stresses. I have found, however, that the upstanding I-beams can be supported in this area, or throughout the entire floor if desired, by a simple contoured insert which makes contact with the side wall and the undersides of the top flanges of adjacent I-beams and which further provides a complementary floor portion between and in the plane of the top flanges of the I-beams.

The contoured insert support of the present invention comprises two parallel side wall panels, a top panel, and substantially sigma-shaped corner elements integrally formed with said panels and interconnecting the side wall panels with opposite edge portions of the top panel. One end portion of each sigma-shaped corner element is aligned with the plane of the side wall panel to which it is joined and the other end of the sigma-shaped corner element is aligned with the plane of the top panel to which it is joined.

Figure 1:
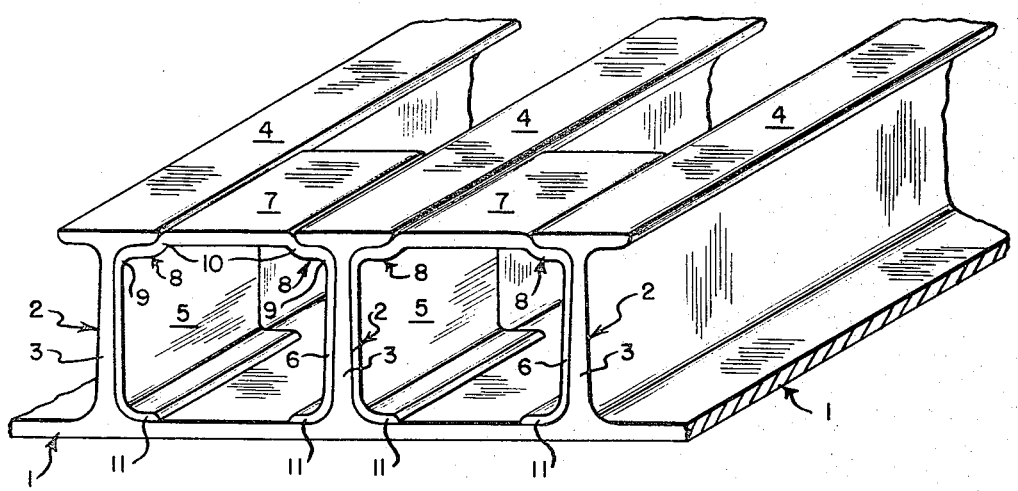
Figure 2:
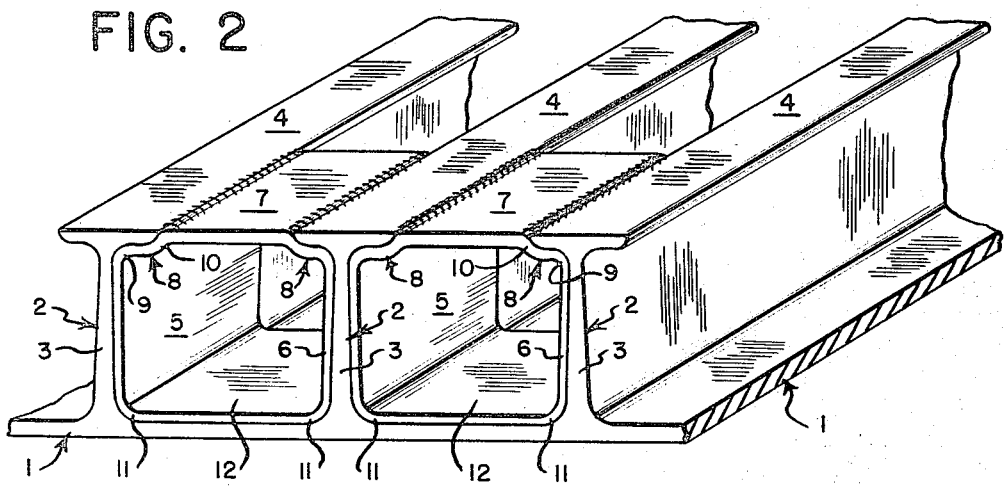

These and other novel features of the contoured insert support of the invention will be more readily understood by reference to the accompanying drawing in which:

FIG. 1 is an isometric view of a portion of an I-beam trailer floor section showing the insertion of a contoured insert support of the invention in supporting position therein; and FIG. 2 shows another modification of the invention in a similar isometric view.

As shown in FIG. 1 the main floor 1, whether the base floor of a vehicle or the floor portion of panel sections laid on the base floor, is provided with a plurality of laterally spaced upstanding I-beams 2. The beams include an upstanding center wall 3 and a horizontal top flange 4 extending outwardly beyond both sides of the center wall 3. The top flange 4 is preferably flat so that a plurality of the spaced flat top flanges form a cargo-support floor above the main floor 1.

The contoured insert support of the invention shown in FIG. 1 comprises two parallel side wall panels 5 and 6 substantially coextensive with the side surface of the I-beam center wall 3 and a top panel 7 of a width such as to span the distance between two adjacent I-beam flanges. Each side wall panel is integrally connected to the top panel by a flexuous corner element 8. One end portion 9 of each corner element is aligned with the plane of its attached side wall panel, and the other end portion 10 of each corner element is aligned with the plane of the attached top panel 7. The resulting corner structure of the insert support is a sigma-shaped contour such as to complement the contour of the underside of the top flange 4 of the I-beam and to raise the top panel 7 to the level of the top of the I-beam flanges. In other words, the corner elements resemble curved corners interconnecting each side wall with the adjacent edge of the top panel and with the central portion of each corner element dimpled inwardly sufficiently to conform to the contour of the underside of the I-beam flange.

In order to obtain maximum support for the I-beam flanges, the lower ends 11 of the insert side walls 5 and 6 are flared inwardly to conform to the contour of the junction between the bottom of the I-beam center wall and the main floor 1 as shown in FIG. 1. For maximum support, the inwardly flared bottom ends of the side wall panels are integrally joined to a bottom wall panel 12, as shown in FIG. 2. In both modifications of the insert supports of the invention, the inserts provide support for the center wall 3 and top flanges 4 of the upstanding I-beam. Further rigidity can be imparted to this support by welding the abutting edges of the top panel 7 to the edges of the cooperating I-beam flanges, as shown in FIG. 2, and by securing the bottom panel of the insert to the main floor 1 by welding, riveting, adhesives or other conventional securing means to assure structural integrity.

The contoured insert support of the invention is of such shape that it can be readily formed by extrusion in long lengths. Whether so extruded or formed by bending flat stock or other procedure, I have found it advantageous to supply the insert support in relatively long lengths which can be used directly as a support for the full length of the I-beams or which can be cut into shorter lengths by the user so as to supply support for the upstanding I-beam cargo floor only in those areas subjected to unusual impact or turning tresses. The insert supports of the invention do not impair the circulation of cooling air between the I-beams in refrigerated carriers or the ease of cleaning the cargo-supporting structure, and are thus useful in providing supplemental support for any portion or all of the cargo-supporting floor of the afore-mentioned type.

I claim:

1. In combination with a cargo-supporting floor having a base panel and integrally formed spaced upstanding T-shaped cargo floor beam elements each having an upstanding center wall and a horizontal top flange which forms the cargo-supporting floor, a contoured insert support comprising two parallel side panels each coextensive with the height of the center wall of the beam elements and engaging the base panel of the floor, a top panel coextensive with the space between the tops of adjacent T's, and substantially sigma-shaped corner elements integrally formed with said panels and interconnecting the side wall panels with opposite edge portions of the top panel, one end portion of each sigma-shaped corner element being aligned with the plane of the side wall panel to which it is joined and the other end of the sigma-shaped corner element being aligned with the plane of the top panel to which it is joined, the contoured support being inserted longitudinally between a spaced pair of the T-shaped cargo floor beam elements with (a) the support side wall panels adjacent the proximate sides of said pair of beam elements, (b) the lower end of the support side wall panels engaging the base panel of the floor, and (c) with the support top panel lying in the plane of the top of the T's and forming therewith a continuous cargo-supporting floor.

2. The combination according to claim 1 in which the intermediate portion of each corner element of the insert support is indented to conform to the contour of the underside of the top of the T-shaped floor beam elements.

3. The combination according to claim 1 in which the two parallel side wall panels conform in height to that of the central portion of the T-shaped floor beam elements.

4. The combination according to claim 1 in which the intermediate portion of each corner element of the insert support is dimpled inwardly.

5. The combination according to claim 1 in which a bottom panel is provided which joins the edges of the side wall panels of the insert support opposite to those edges thereof which are joined to the sigma-shaped corner elements.

References Cited

UNITED STATES PATENTS

| | | | |
|---|---|---|---|
| 3,336,708 | 8/1968 | Rambelle | 52—729 |
| 876,134 | 1/1908 | Berg | 52—630 |
| 1,772,694 | 8/1930 | White | 52—588 |
| 2,382,761 | 8/1945 | Wilks | 52—579 |
| 2,711,231 | 6/1955 | Spangler | 52—588 |
| 2,742,116 | 4/1956 | Fitzgerald | 52—591 |
| 2,878,904 | 3/1959 | Fanner | 52—579 |
| 2,952,341 | 9/1960 | Weiler | 52—588 |
| 3,100,556 | 8/1963 | De Ridder | 52—588 |
| 3,324,616 | 6/1967 | Brown | 52—588 |

FOREIGN PATENTS

| | | |
|---|---|---|
| 1,081,087 | 1954 | France. |
| 742,285 | 1955 | Great Britain. |

HENRY C. SUTHERLAND, *Primary Examiner.*

S. D. BURKE, *Assistant Examiner.*

U.S. Cl. X.R.

52—579, 729, 732